(No Model.)
C. J. HAMILTON.
STOVE PIPE ATTACHMENT.
No. 331,637. Patented Dec. 1, 1885.
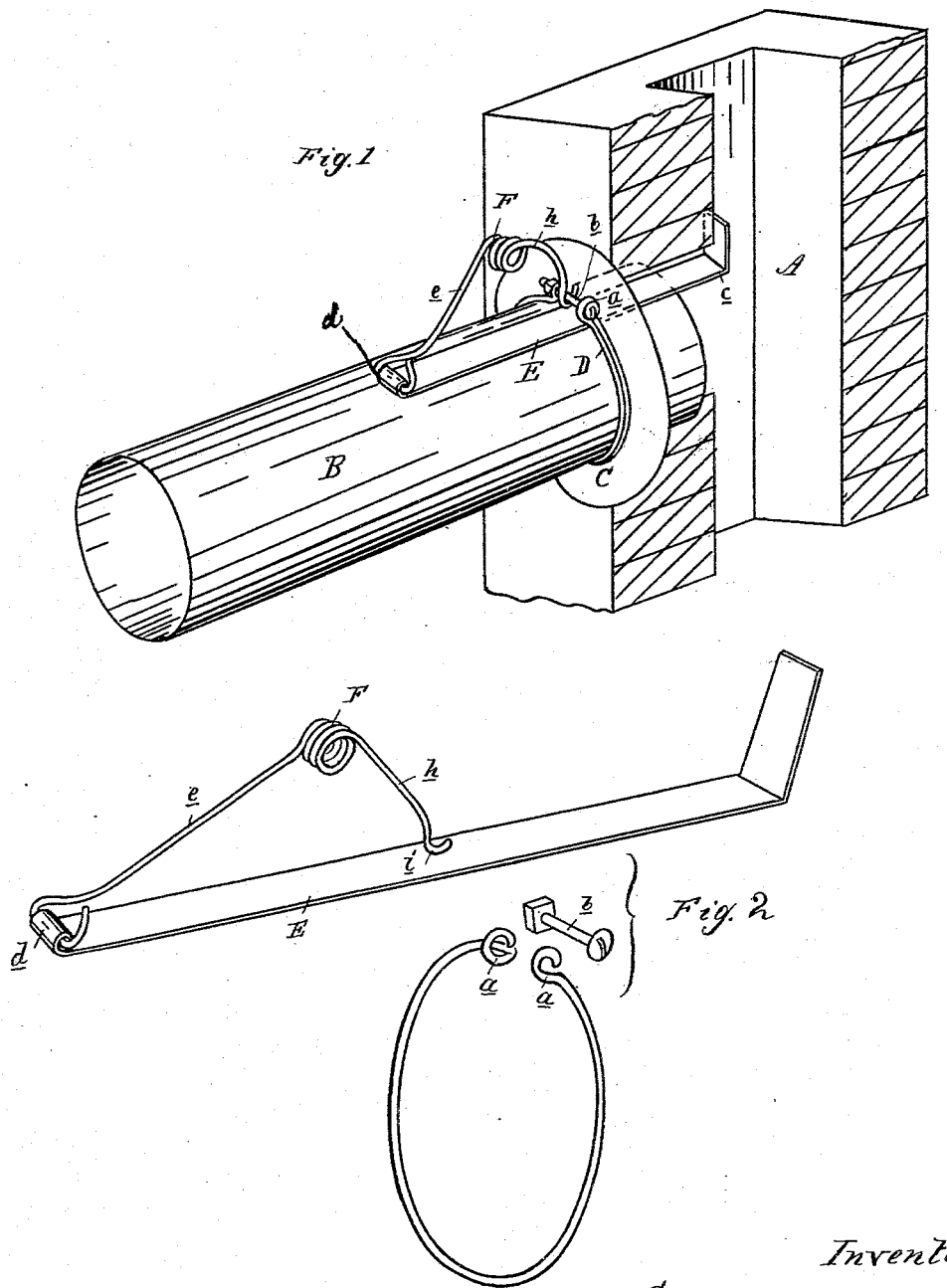
Attest:
John Schuman.
Inventor:
Clarence J. Hamilton.
by his Att'y

UNITED STATES PATENT OFFICE.

CLARENCE JAMES HAMILTON, OF PLYMOUTH, MICHIGAN, ASSIGNOR OF ONE-HALF TO WM. O. ALLEN, OF SAME PLACE.

STOVE-PIPE ATTACHMENT.

SPECIFICATION forming part of Letters Patent No. 331,637, dated December 1, 1885.

Application filed April 29, 1885. Serial No. 163,793. (No model.)

*To all whom it may concern:*

Be it known that I, CLARENCE J. HAMILTON, of Plymouth, in the county of Wayne and State of Michigan, have invented new and useful Improvements in Stove-Pipe Attachments; and I do hereby declare that the following is a full, clear, and exact description thereof, reference being had to the accompanying drawings, which form a part of this specification.

This invention relates to certain new and useful improvements in attachments to stove-pipes, designed to secure such pipes to the chimney.

The object of this invention is to provide a simple attachment to the pipe, by means of which, when the pipe is inserted, it will be held rigidly in its place and prevented from either slipping in or out of the hole.

The invention consists in the peculiar construction of the parts and their combination and operation, as more fully hereinafter described and claimed.

Figure 1 is a perspective view showing a length of pipe inserted in the chimney-breast with an ordinary collar and secured therein by my improved device. Fig. 2 is a perspective view of the parts detached from the pipe.

In the accompanying drawings, A represents a chimney-breast, B a stove-pipe, and C a collar, all of the usual construction. D is a substantially-circular wire band, the ends of which terminate in eyes $a$, through which a small bolt and nut, $b$, passes to secure the ends of such band together, leaving a space between the two ears occupied by the screw or bolt, for the purposes hereinafter mentioned. E is a narrow strip of thin metal, one end of which is bent at right angles to the body, as shown at $c$, while the opposite end terminates in a loop, $d$, which embraces the end of one of the arms $e$ of a coil-spring, F, while the other arm, $h$, terminates in a pointed hook, $i$.

In practice the wire band D is made of various sizes to fit the various sizes of stove-pipes, and is placed upon the pipe preferably in the hollow of one of the beadings, (not shown,) near the end of such pipe which is designed to enter the chimney, and tightened in its place by means of the bolt and nut. The metal strip is laid upon the pipe and between it and the bolt, so that it will have a free horizontal motion between the ears of the band D, care being taken that the arm formed by bending the end of the strip projects outwardly from the axis of the pipe. The end of the pipe being inserted through the chimney-breast with the strip projecting beyond the end of the pipe, the arm of the pipe is drawn back against the inner face of the chimney-breast, when it is secured in such position by engaging the hook $i$ and the bolt of the band D, as shown in Fig. 1.

It will be noticed that the construction of this device is very simple and inexpensive, while at the same time it is very effective in operation, thoroughly securing the pipe in its position against motion in either direction until the hook $i$ is released.

What I claim as my invention is—

In combination with a stove-pipe, a substantially-circular band embracing such pipe, a bolt securing the two ends thereof together, and a metallic strap bent at one end to engage with the chimney-breast, and carrying at its other end a lever formed of spring-wire having a coiled spring near its center, and terminating in a hook to engage with the bolt which secures the two ends of the circular band together, substantially as described.

CLARENCE J. HAMILTON.

Witnesses:
H. S. SPRAGUE,
CHARLES J. HUNT.